2,726,142

PRODUCTION OF HYDROGEN CHLORIDE FROM CHLORIDES

Lewis Reeve, Sheffield, England, assignor to The United Steel Companies Limited, Sheffield, England No Drawing. Application December 29, 1952, Serial No. 328,520

Claims priority, application Great Britain January 1, 1952

6 Claims. (Cl. 23—154)

This invention relates to a method of obtaining hydrogen chloride.

It is known that hydrogen chloride can be obtained by hydrolysing the chlorides of the alkali or alkaline earth metals at an elevated temperature with steam according to the following typical equations:

$$CaCl_2 + H_2O = CaO + 2HCl$$
$$MgCl_2 + H_2O = MgO + 2HCl$$

The reaction is commonly carried on in the presence of silicious material, which presumably combines with the basic products of the hydrolysis to form silicates, but it may also be carried on in the presence of aluminous material, which presumably combines with the basic material to form aluminates. Many silicious materials contain alumina and many aluminous materials contain silica, and these may of course be used. Whether or not silicates or aluminates or both are formed silicious or aluminous material must be present if the reaction is to proceed.

The processes as carried on hitherto have suffered from the drawback that so much steam has been required that on condensation of the reaction gases the resultant acid has been obtained as an extremely dilute solution.

It is an object of this invention to obtain hydrogen chloride from the chlorides of the alkali or alkaline earth metals.

It is a further object to obtain hydrogen chloride from the tailings or residues resulting from the production of ferric chloride from silicious iron ores. Such tailings contain the alkali and alkaline earth metals present originally in the ores as their chlorides.

According to my invention, the steam is diluted with a gas which does not enter into reaction with the reactants or reaction products. The gas may be air or inert gas, e. g. nitrogen, or waste combustion gases, which in general consist of carbon dioxide, nitrogen and air. The presence of the gas reduces the partial pressure of the steam. It is, however, still necessary to use the steam in an amount in excess of that required for the hydrolysis of the chlorides.

When diluted steam is used, the proportion of hydrogen chloride to steam in the gases produced is much increased, and in consequence hydrochloric acid of much greater strength is obtained. The hydrolysis with steam appears to be a surface reaction, the velocity of which is almost independent of the concentration of the steam over a wide range. Moreover, since the hydrolysis reactions lead to an increase of gas volume the effect of reducing the partial pressure of the steam is to drive the reactions more to the right and so to improve the equilibrium ratios of hydrochloric acid gas to steam. However this may be, the important fact is that considerably less steam is required to complete the reaction than would be required were no dilution with air or other gases employed, and the proportion of hydrogen chloride to steam in the gases at the end of the reaction is much higher if diluted steam is used.

The degree of dilution is preferably such that the gas mixture contains no more than 40% steam. Very satisfactory results are obtained with mixtures containing 10% steam. If, however, the proportion of steam is reduced to much below this figure, the volume of inert gas required may become inconveniently high, although hydrolysis can be carried out with as little as 3% of steam in the gas mixture. Gases of combustion often contain steam in amounts depending on the hydrogen content of the fuel, and when they do they may be used as the gas mixtures by which the hydrolysis is effected according to the invention.

The invention is particularly valuable in the treatment of tailings or residues resulting from the production of ferric chloride from silicious iron ores, by treating the ore with hydrogen chloride (gaseous HCl) as described for instance in application Serial No. 174,492 or with hydrochloric acid (aqueous HCl). In producing ferric chloride in these ways, some of the hydrogen chloride or hydrochloric acid forms chlorides of calcium and magnesium which remain in the ore tailings after the extraction of the ferric chloride.

In the silicious or aluminous material present in the reaction the total content of silica and alumina may vary from 15 to 100%. If the total content is less than 15% the reaction either will not proceed at all or will proceed so slowly as to make the process impracticable. If an iron ore contains appreciable quantities of silica or alumina (most silicious ores also contain alumina), the tailings from it containing the chlorides of calcium and magnesium will also contain enough silicious and aluminous materials and so may be treated without more ado. These tailings are normally present in finely divided form since the ores from which they originate are preferably treated under fluidising conditions, using hydrogen chloride and iron ore less than 1/10 inch in size at the most. As they are of suitable size I prefer to carry out the hydrolysis of the chloride-containing tailings also under fluidising conditions, the tailings being supported on a perforated diaphragm as a bed of particles, which may be several feet deep, and adjusting the velocity of the mixture of steam and diluent gas passing through the bed to such a value as to maintain the particles of tailings in a turbulent state, though not at such a high value as to blow all the particles out of the reaction chamber. Any finely divided particles which are carried over by the gas stream may be trapped in a cyclone and returned to the bed. If desired, more than one bed may be used, superimposed one above another in an enclosed tower, the tailing particles being fed into the upper bed from a hopper and passing downwards from bed to bed through vertical pipes until they are discharged stripped of their chloride content, from the bottom bed. The gaseous mixture of steam and air or other diluent gas, pre-heated to the reaction temperature, passes upwards through each bed in turn and is discharged at the top of the tower, carrying the hydrogen chloride with it.

The heating of the tailings may be carried out by means of the hot products of combustion of solid, liquid or gaseous fuels burnt, preferably with excess air, within the fluidised bed or beds or in an external combustion chamber.

If combustion is to take place within the fluidised bed or beds the fuel mixed with primary air can be introduced into the fluidising apparatus by means of suitable burners inserted in the bed, and the combustion products, together with excess secondary air introduced below a perforated distribution plate, will serve to fluidise the tailing particles. If the combustion products contain steam the hydrolysis will take place in the fluidised beds while the particles are being heated. If the steam contained in the combustion products is insufficient for hydrolysis some steam may be introduced from an external source.

To show the advantage of diluting the steam, one iron ore tailing containing 3.4% Fe, 54.8% $SiO_2$, 24.0% $Al_2O_3$; 3.7% CaO and 5.86% Cl; was treated with steam alone at 1110° F.; practically all the chlorine was removed in 1 hour but the average HCl percentage in the gases leaving the hydrolysing tower was only about 1% of the steam volume. On treating the same tailings with a mixture of 10% steam and 90% air at 1110° F., practically all the chlorine was again removed in about 1 hour, but the average HCl content in the gases leaving the tower was about 3% of the total volume, or about 30% of the steam volume.

Although the invention is particularly useful in the treatment of the tailings described above, it is not limited to this, but sodium, potassium, calcium and magnesium chlorides from any source may be hydrolysed in the same manner with the recovery of hydrochloric acid. Such chlorides may be added to any appropriate silicious or aluminous material, which may in fact already contain some chlorides. These chlorides may, if desired, originate in tailings of the kind in question and be extracted from them with water to make a concentrated solution of calcium, magnesium and manganese chlorides, which may then be absorbed in a silicious or aluminous material. The resultant impregnated material is then treated with a hot gaseous mixture of steam and air or inert gas as previously described. This modification of the invention is particularly useful in treating tailings from ores which contain too little silica or alumina for the hydrolysis to proceed at a practical speed.

When chlorides are added to a silicious or aluminous material they are preferably in the form of strong aqueous solutions, as these mix with the silicious or aluminous material much better than powdered dry chlorides, and the subsequent hydrolysis reaction proceeds much faster. These solutions may be sprayed onto the cold incoming silicious or aluminous materials, or may be sprayed or blown into the hot fluidised bed or beds. Alternatively, a slurry or mud consisting of a mixture of the chloride solution and the finely-divided tailings or other silicious or aluminous material may be injected into the reaction vessel. Heating the slurry will drive off the water as steam, which may be used for hydrolysing the chlorides.

The silicious or aluminous material to which chlorides are added may be the tailings referred to, i. e. the residues remaining after the treatment of silicious iron ores with hydrogen chloride, iron, manganese or aluminium ores, or such materials as sand, clay, alumina and talc. The ores which may be used as silicious material, and the ores from which the tailings are usually obtained, are low-grade bedded silicious iron ores containing less than 45% iron when mined, such as those ores which are mined in Alabama and the taconite ores of the Lake Superior region. Other similar ores are those mined in England in Lincolnshire, Northamptonshire and Oxfordshire; and in Luxembourg and Alsace Lorraine; and in Germany (particularly in Baden, Württemberg, Bavaria, and in the Salzgitter Ilsede region). It is preferable, however, that the ores contain not more than 10% of lime plus magnesia.

The maximum weight of chlorides which may be hydrolysed according to the invention depends upon the type of chloride used, the nature of the silicious or aluminous material present and the time and temperature of the reaction. The chlorides of magnesium and the alkaline earths are hydrolysed more easily and at a lower temperature than those of the alkali metals such as sodium chloride.

When the tailings obtained from Northamptonshire or similar ores by treatment with hydrogen chloride at 480 to 1290° F. and containing about 5% Fe, 50% $SiO_2$ and 20% $Al_2O_3$ are used as the starting material, as much as 15% of calcium or magnesium chloride or 7% of sodium chloride by weight of these tailings may be hydrolysed at about 1110 to 1290° F.

Ordinary sand, which contains over 90% $SiO_2$ can also be used, and about 12% calcium chloride can be hydrolysed from this at about 1110° F., and about 6% of sodium chloride at about 1290 to 1470° F.

Alumina is about as effective as sand.

When a silicious Northamptonshire or similar ore containing about 40% Fe, 20% $SiO_2$ and 9% $Al_2O_3$ is used, about 7% of calcium or magnesium chloride, or 4% of sodium chloride, on the weight of the ore, may be hydrolysed at about 1110 to 1290° F.

Kaolin and talc, which are essentially aluminum and magnesium silicate respectively, are not as effective as materials containing free $SiO_2$ or free $Al_2O_3$.

A highly reactive material is the silicious residue, containing about 90% of $SiO_2$, obtained by treating Northamptonshire or similar iron ores or silicious tailings with hydrochloric acid. Over 20% of calcium chloride or about 10% of sodium chloride can be hydrolysed on the surface of this material at 1110 to 1290° F. However, acid-extracted silica is a relatively expensive material and it is not usually economical to use it despite its high reactivity.

The silicious or aluminous material used can be returned to the process after hydrolysis of the chlorides, to take part in further hydrolysis reactions, but a stage will be reached when the material is saturated with magnesia and lime and it can then no longer be used, and must be discharged from the process.

The time necessary for reaction is of the order of 1 to 3 hours, depending upon the chloride and the temperature. The hydrolysis may be carried out within a very broad temperature range, the temperature used also being dependent to a certain extent on the nature and proportions of the chlorides. The temperature may be as low as 510° F. to hydrolyse magnesium chloride, but calcium chloride requires a higher temperature and sodium chloride a higher temperature still. To ensure hydrolysis of all the chlorides likely to be present the temperature is preferably at least 930° F. More rapid hydrolysis may be obtained by raising the hydrolysis temperature to 1470° F. As, however, at higher temperatures than this chlorides attack many of the refractory materials from which the reaction chambers are usually made, it is preferred that the temperature should be less than 1470° F. and it should not in general exceed 1650° F. as the attack on most refractories is much accentuated above this temperature.

In order to recover the hydrochloric acid gas produced according to the invention, the gas mixture leaving the tower or other hydrolysing vessel may be passed through iron ore at temperatures from room temperature up to 390° F., preferably from 250 to 320° F., whereupon practically all the hydrogen chloride and a little of the steam are absorbed. The iron ore for this absorption may be ore which is to be treated to yield ferric chloride. The remaining steam, together with the air or other diluent gases, is discharged to the atmosphere. Alternatively, all the hydrogen chloride and steam may be condensed to produce aqueous solutions of hydrochloric acid, the quantity of steam in the hydrolysing gases being adjusted to attain the desired strength of acid solution. Further, the gases may also be washed with water in suitable towers to remove hydrogen chloride.

I claim:

1. In a method of obtaining hydrogen chloride from at least one chloride of a metal selected from the group consisting of alkali and alkaline earth metals, said chloride being present in a silicious tailing resulting from the production and extraction of ferric chloride from a silicious iron ore by treatment with HCl, the steps which comprise treating said tailing with a gas mixture consisting of steam and at least one gas selected from the group consisting of air, inert gas and waste combustion gases the total steam content of the mixture not exceeding 40% at a temperature between 930° and 1650° F. to hydrolyse said chloride and condensing the gas formed.

2. The process of claim 1, in which said tailings are treated with said gas mixture in a fluidized particulate state.

3. The process of claim 1, in which the heat necessary for the reaction is supplied by burning a fuel in the presence of excess air within the reaction chamber.

4. The process of claim 1, in which the heat necessary for the reaction is supplied by burning fuel in the presence of excess air within the reaction chamber to produce combustion gases containing steam and excess air and employing the combustion gases from the burning of said fuel as said mixture.

5. The process of claim 1, in which said treatment is carried out at temperatures between 930 and 1470° F.

6. The process of claim 1 in which combustion gases containing steam are employed for said treatment.

References Cited in the file of this patent

UNITED STATES PATENTS

| | | |
|---|---|---|
| 1,533,009 | Kerstein | Apr. 7, 1925 |
| 1,923,324 | Mitchell | Aug. 22, 1933 |

OTHER REFERENCES

J. W. Mellor's: "A Comprehensive Treatise on Inorganic and Theoretical Chem.", vol. 2, 1933 ed., pages 163, 164 Longmans, Green and Co., N. Y.